MAGNETIC TAPE CARTRIDGE CHANGING MECHANISM

Filed Aug. 4, 1965 8 Sheets-Sheet 1

INVENTORS
WARD DEIGHTON &
ANTHONY G. CAPRIO
BY Samuel Cohen
Attorney

MAGNETIC TAPE CARTRIDGE CHANGING MECHANISM

INVENTORS
WARD DEIGHTON &
ANTHONY G. CAPRIO
BY Samuel Cohen
Attorney

MAGNETIC TAPE CARTRIDGE CHANGING MECHANISM

Filed Aug. 4, 1965

INVENTORS,
WARD DEIGHTON &
ANTHONY G. CAPRIO
BY Samuel Cohen
Attorney

MAGNETIC TAPE CARTRIDGE CHANGING MECHANISM

Filed Aug. 4, 1965

8 Sheets-Sheet 4

INVENTORS
WARD DEIGHTON &
ANTHONY G. CAPRIO
BY Samuel Cohen
Attorney

MAGNETIC TAPE CARTRIDGE CHANGING MECHANISM

INVENTORS
WARD DEIGHTON &
ANTHONY G. CAPRIO
BY Samuel Cole
Attorney

Sept. 26, 1967 W. DEIGHTON ETAL 3,343,687

MAGNETIC TAPE CARTRIDGE CHANGING MECHANISM

Filed Aug. 4, 1965 8 Sheets-Sheet 6

INVENTORS
WARD DEIGHTON &
ANTHONY G. CAPRIO
BY Samuel Cohen
Attorney

INVENTORS
WARD DEIGHTON &
ANTHONY G. CAPRIO
BY Samuel Cohen
Attorney

MAGNETIC TAPE CARTRIDGE CHANGING MECHANISM

Filed Aug. 4, 1965 8 Sheets-Sheet 8

INVENTORS
WARD DEIGHTON &
ANTHONY G. CAPRIO
BY Samuel Cohen
Attorney

United States Patent Office 3,343,687
Patented Sept. 26, 1967

3,343,687
MAGNETIC TAPE CARTRIDGE CHANGING MECHANISM

Ward Deighton, Glen Mills, Pa., and Anthony G. Caprio, Cherry Hill, N.J., assignors to Radio Corporation of America, a corporation of Delaware
Filed Aug. 4, 1965, Ser. No. 477,134
7 Claims. (Cl. 214—1)

ABSTRACT OF THE DISCLOSURE

This disclosure relates to a new and improved automatic cartridge changing mechanism for a magnetic tape station of the cartridge loaded type and to the mechanical movement employed therein. In this type of tape station, upon command the magnetic head is automatically withdrawn and the tape is automatically rewound upon its reels within the cartridge. Thereafter, the cartridge is automatically removed and a new cartridge is automatically placed in its operating position.

Magnetic tapes are widely used for the storage of binary information. The tapes are stored on reels and it takes an appreciable amount of time for a skilled operator manually to remove one reel and to insert a new one. To reduce this time interval and to eliminate the bother of manually having to thread the tapes, "cartridge-loaded" tape systems have been developed. When the cartridge (consisting of two reels of tape in a closed housing) is manually placed in its operating position, its reels and tape are automatically engaged by appropriate driving means and a magnetic head automatically moves into tape-engaging position.

An object of the present invention is to provide an improved system for automatically removing a cartridge from its operating position and for automatically replacing it with a new one. Such operation may be upon command from the control system of a computer associated with the tape system.

Another object of the invention is to provide an automatic cartridge-changing system which is relatively simple and trouble-free.

Another object of the invention is to provide a cartridge-changing system which includes interlock features to prevent faulty operation of the system.

The cartridge-changing system of the invention includes a receiving station for the cartridge having a base adapted to receive the base of the cartridge and a cam surface which extends at a generally oblique angle from said base. The cartridge is lowered along a straight line first path onto the cam surface, thereby causing a lower edge of the cartridge to ride along the cam surface until it abuts the base of the receiving cartridge. During this movement, the cartridge tilts and, after it has reached the base of the receiving station, the cartridge is driven in a direction generally perpendicular to the first path to pivot the cartridge about its lower edge until it is in its upright position on the base of the receiving station.

In a preferred form of the invention, the cartridge includes side plates formed with slots which open on the lower edges of the side plates. The receiving station includes pins which are positioned to engage the slots. The tilting of the cartridge as it moves down the cam surface permits the slots to ride over end engage the pins, and these pins serve accurately to position the cartridge when it is pivoted to its upright position.

The invention is discussed in greater detail below and is shown in the following drawings, of which:

Figure 1:
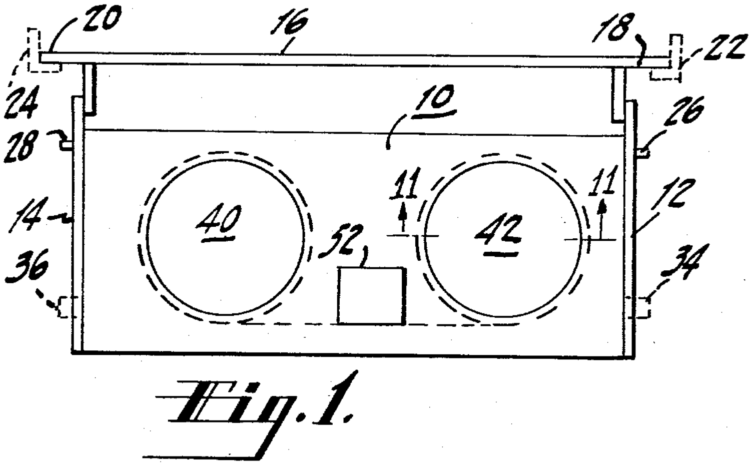
FIGURE 1 is a rear view of a magnetic tape cartridge of the type employed in the system of the invention.

The cartridge 10 shown in FIGURE 1 includes a metal housing which contains two reels for tape 40 and 42. Side plates 12 and 14 are secured to the housing and a top plate 16, which includes projecting ends 18 and 20, is fixed to the side plates. The projecting ends 18 and 20 are engageable by hooks 22 and 24. The hooks are shown by dashed lines in FIGURE 1, as they are part of the cartridge-changing system rather than part of the cartridge.

Figure 2:
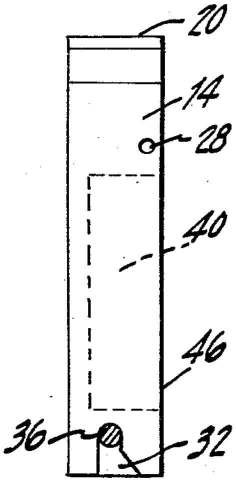
FIGURE 2 is a side view of the cartridge of FIGURE 1.

Pins 26 and 28 extend from the side plates 12 and 14, respectively. These pins are engageable by latches, one of which is shown at 30 in FIGURE 8, when the cartridge is in its operative position. The plates 12 and 14 are formed with slots, one of which is shown at 32 in FIGURE 2, at their lower ends. These slots fit over pins 34 and 36, respectively, on the tape station.

Figure 11:
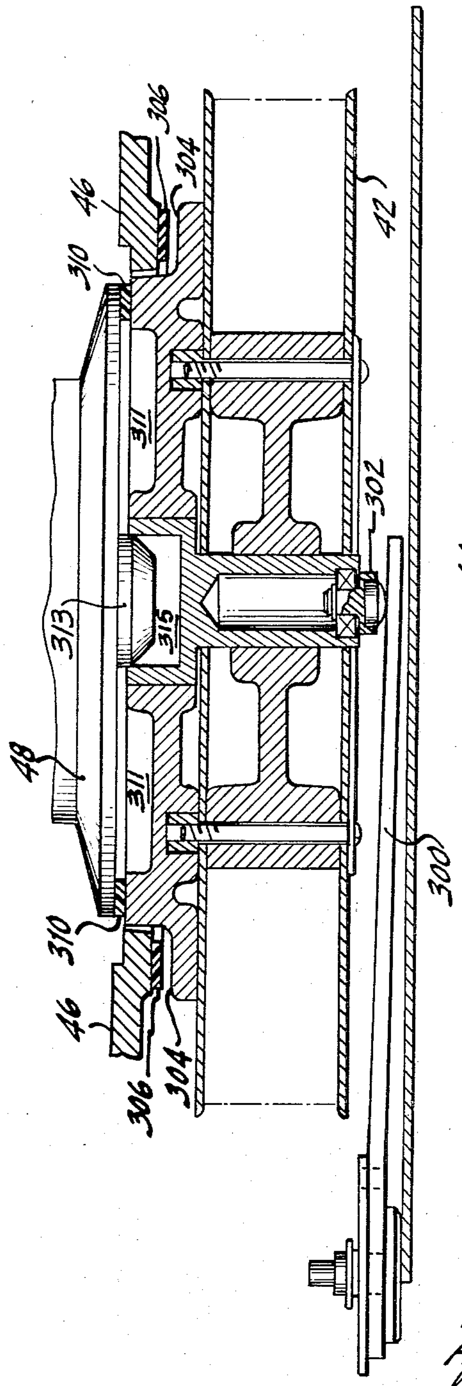
FIGURE 11 is a cross-section through a portion of a cartridge.

The structure of a reel and the manner in which it is positioned in the cartridge is shown in FIGURE 11. The reel 42 itself is considerably larger than the circular opening in the rear wall 46 of the cartridge. A leaf spring 300 engages a button 302 at the center of the reel and normally maintains the portion 304 of the reel abutting the rubber washer 306. Thus, the reels are normally held in position and prevented from rotating.

The reel drive element 48 is a circular member which is part of the tape station. A rubber ring or washer 310 is fixed to the face of the drive element and forms an air tight seal for chamber 311. The drive element 48 is driven by a drive mechanism illustrated schematically by block 50 in FIG. 8.

When the cartridge is in place, the reel "pilot" (part of the drive element 48) 313 snugly fits into the circular opening 315 in the reel and the rubber ring 310 abuts the reel. The drive element and its ring 310 cause the reel to move away from the rubber ring 306 against the tension of the leaf spring 300. A vacuum is applied to the chamber 311 to hold the reel in place on the drive element 48. The drive element may now be rotated by the drive mechanism 50 and this causes the reel to rotate at high speed. During this rotation, the button 302 rides on the leaf spring.

Figure 8:
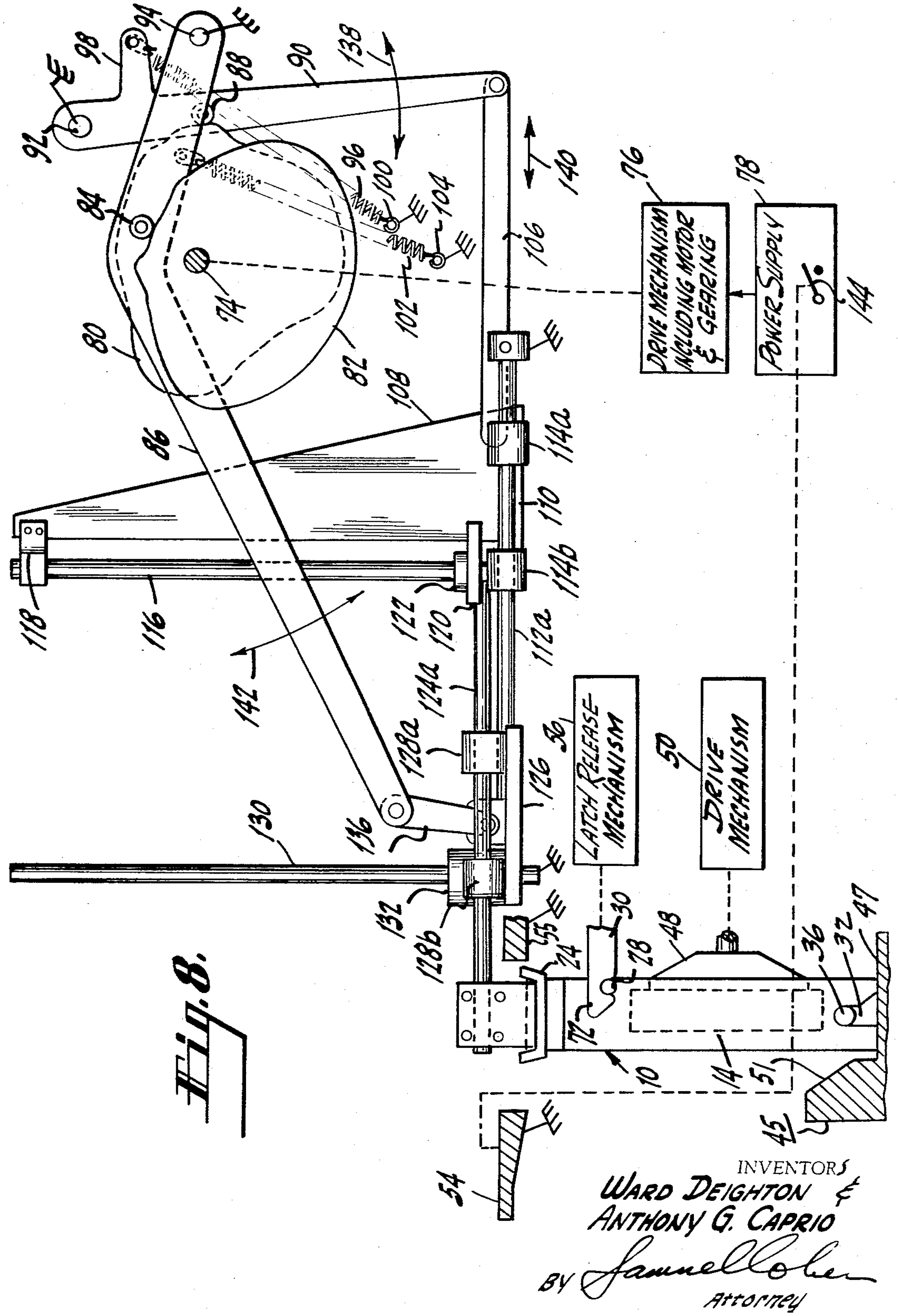
FIGURE 8 is a side view showing the details of the mechanical driving elements of the cartridge changer of the present invention.

FIGURE 8 shows the cartridge 10 in its operative position in the cartridge-receiving station 45. The latter includes a base 47 on which the cartridge stands, and cam surfaces 51 which extend at a generally oblique angle from the base 47. In practice, there are two cam surfaces 51, one positioned to engage the lower front edge of the side plate 14 and the other positioned to engage the corresponding edge of the opposite side plate 12 (FIGURE 1). As explained shortly, the cartridge rides along these cam surfaces when it is lowered into its operating position in the receiving station.

The cartridge is in its upright position in FIGURE 8, the pins 36 and 34 (FIGURE 1) engaging the slots 32, only one of which is visible in FIGURE 8, in the side plates. These pins and slots serve accurately to position the cartridge. The latch 30 engages the pin 28. A corresponding latch (not shown) engages the pin 26 on the other side of the cartridge. Reel driving members, one of which is shown at 48, now engage and drive the respective reels in the manner already discussed.

Returning for a moment to FIGURE 1, there is a square opening 52 in the rear wall of the cartridge. When the cartridge 10 is in the position shown in FIGURE 8, a head-moving mechanism (not shown) in the tape station drives the magnetic head (not shown) through this opening and brings it into read-write relation with the magnetic tape. This head-moving mechanism is described in detail in copending application Serial No. 436,868, filed by Ward Deighton on March 3, 1965, and assigned to the same assignee as the present application.

Returning to FIGURE 8, when the cartridge is in its operative position, two hooks, one shown at 24, engage the extensions 20 and 18 of the top plate 16 (shown in FIGURE 1) of the cartridge.

The platform 54, shown in FIGURE 8, receives the cartridge 10 when it is automatically removed from its operative position, as is discussed in more detail later. The platform 55, shown only in part in FIGURE 8, receives the next cartridge which the automatic changer is to move into operative position.

Before discussing the entire mechanical system of FIGURE 8, the various steps in a cartridge-changing cycle will be dealt with beginning with the cartridge in the position shown in FIGURE 8. These steps are shown in FIGURES 3–7.

Upon receipt of a command from the computer that the cartridge in operative position is to be removed and a new one inserted, the latch release mechanism 56 of FIGURE 8 raises the latch 30. The changing mechanism moves the hooks 24 and 22 (not shown) to the left, as indicated by arrow 57 in FIGURE 3, causing the cartridge to tilt on its front corner 58. Then, the hooks 24 and 22 move upward, causing the lower front corner 58 of the cartridge to ride along the cam surface 51. The next cartridge to be inserted in the operative position is shown at 10*a*, having been placed on the waiting platform 55 prior to the start of the cartridge-changing cycle.

Figure 4:
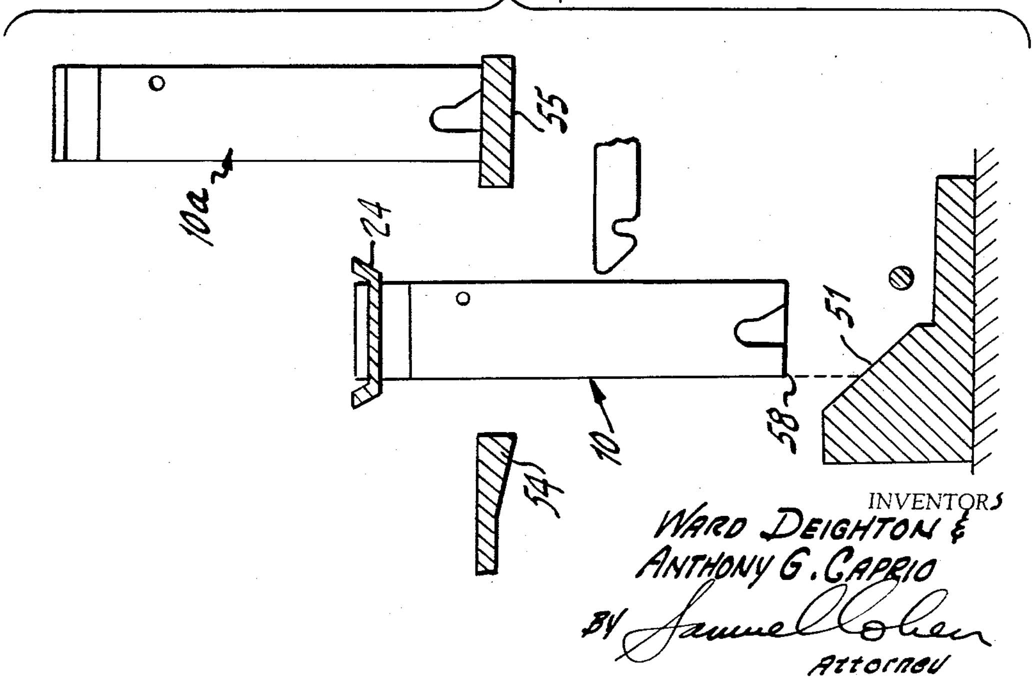

FIGURE 4 shows the cartridge 10 somewhat later in its operating cycle. The bottom front corner 58 of the cartridge has left the cam surface 51. The hooks 24 and 22 have started their upward movement, lifting the cartridge with them.

Figure 5:
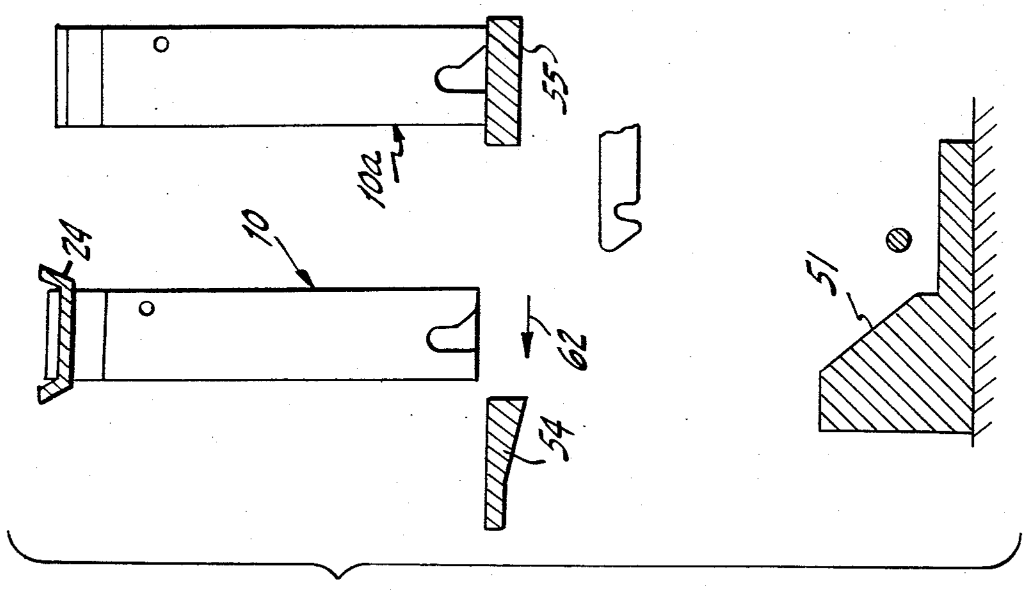

FIGURE 5 shows the cartridge somewhat later in its cycle. It has reached the furthest upward portion of its movement and has started to move to the left, as indicated by arrow 62, toward a position over the platform 54.

Figure 6:
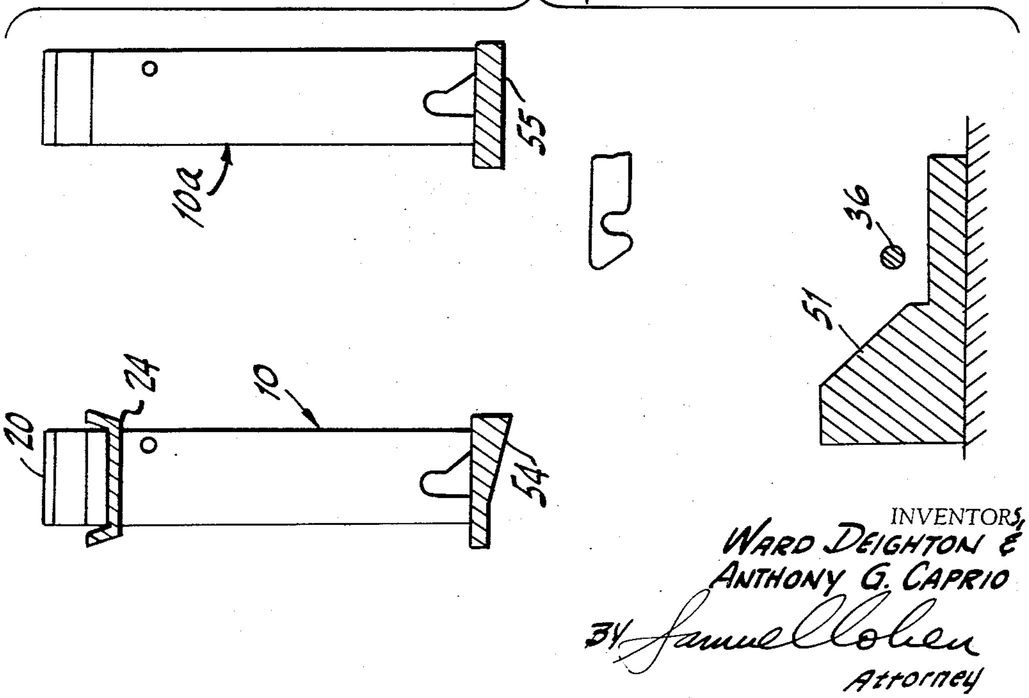

In FIGURE 6, the hooks 24 and 22 have moved the cartridge over the platform 54 and have then moved downward. The hooks 24 and 22 are therefore disengaged from the end portions 20 and 18 of the top plate of the cartridge and the cartridge stands on the platform.

Figure 7:
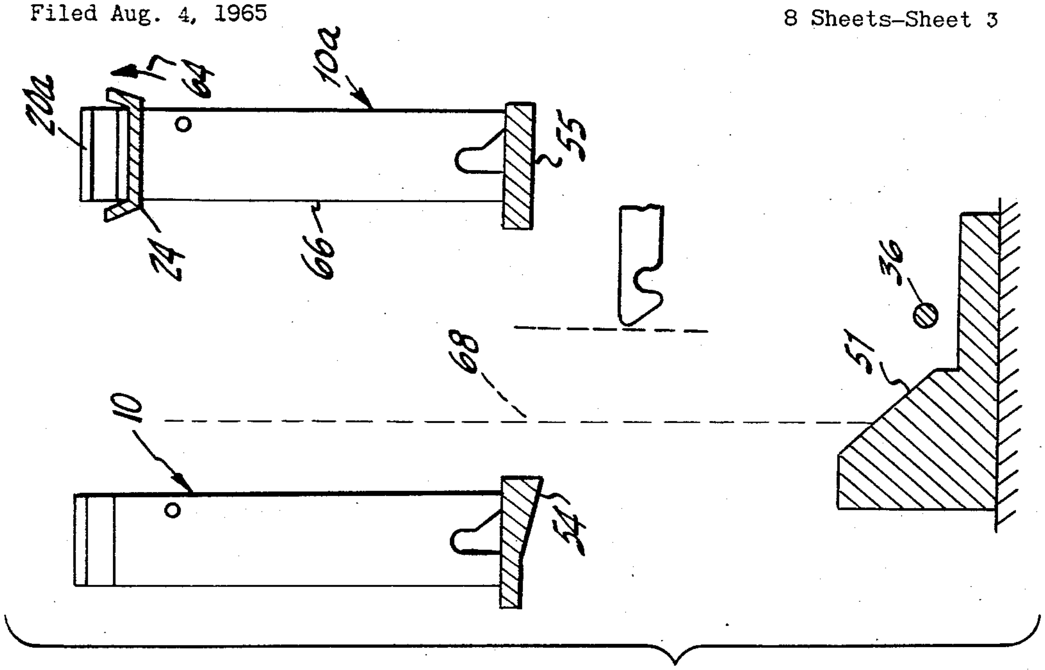

In FIGURE 7, the hooks 24 and 22 have moved to their furthest right position under the extensions 20*a* and 18*a* (not shown) of the top plate of the waiting cartridge 10*a*. Thereafter, the hooks move up, as indicated by arrow 64, until they engage the opposite end portions of the top plate of the cartridge and continue to move up until the cartridge 10*a* is lifted slightly above the waiting platform 55. Then, the hooks and the cartridge with them move to the left, until the front face 66 of the cartridge 10*a* aligns with an imaginary line, shown by dashes 68 immediately over the cam surface 51.

Figure 3:
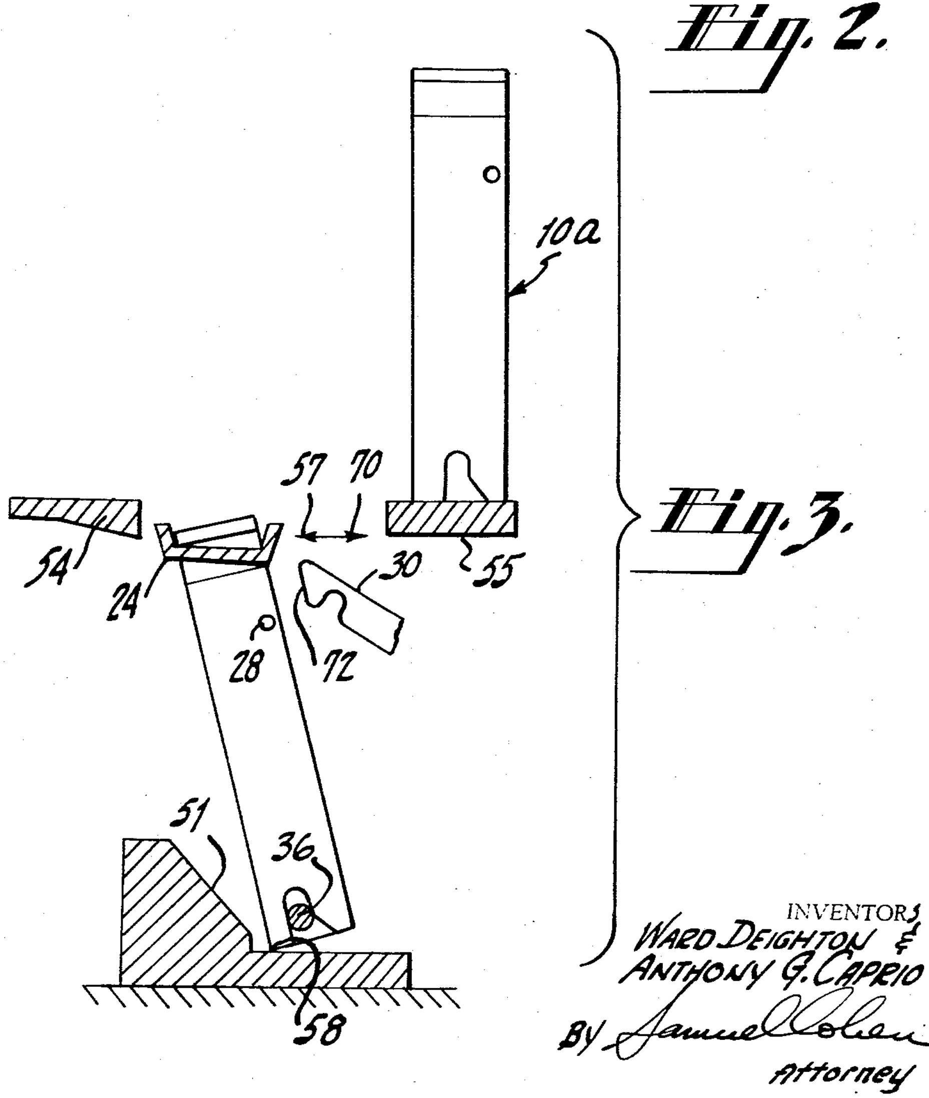
FIGURES 3–7 are views of the tape cartridge in different positions of the automatic changing cycle.

At this point, the hooks 24 and 22 and cartridge 10*a* move down to the position shown in FIGURE 4. This downward movement continues until the front corner 58 of the cartridge strikes the cam surface 51 and rides down the cam surface to the position shown in FIGURE 3. Then the hooks move to the right, as indicated by arrowhead 70 in FIGURE 3. The latch 30 is in its downward position. The pin 28 strikes the forward cam surface 72 of the latch 30, causing the latch to move upward and then to drop over the pin 28. The same thing occurs, of course, at the opposite latch and pin, neither one of which is shown in FIGURE 3.

Figure 9:
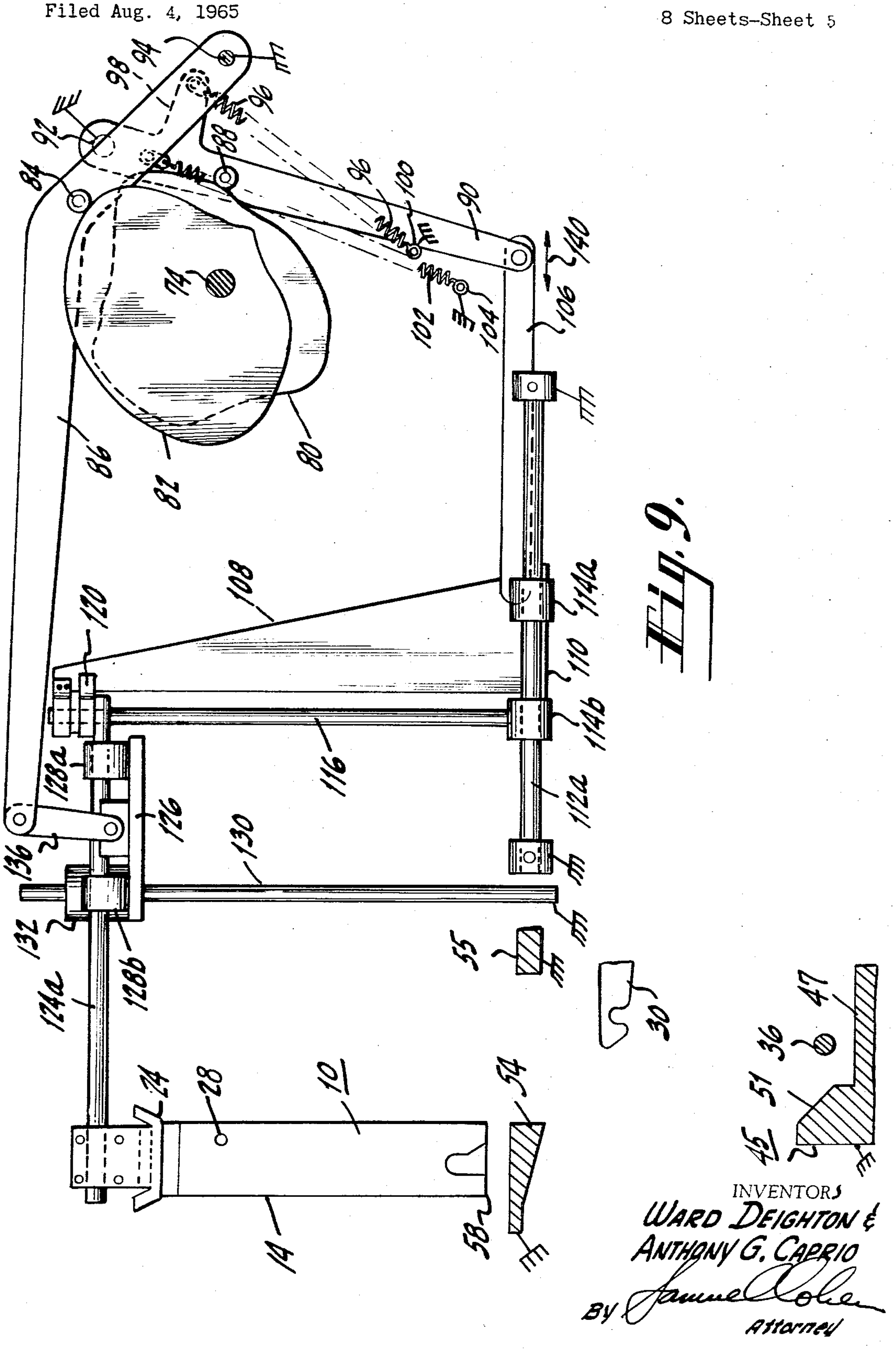
FIGURE 9 shows the system of FIGURE 8 in a different portion of its operating cycle.
Figure 10:
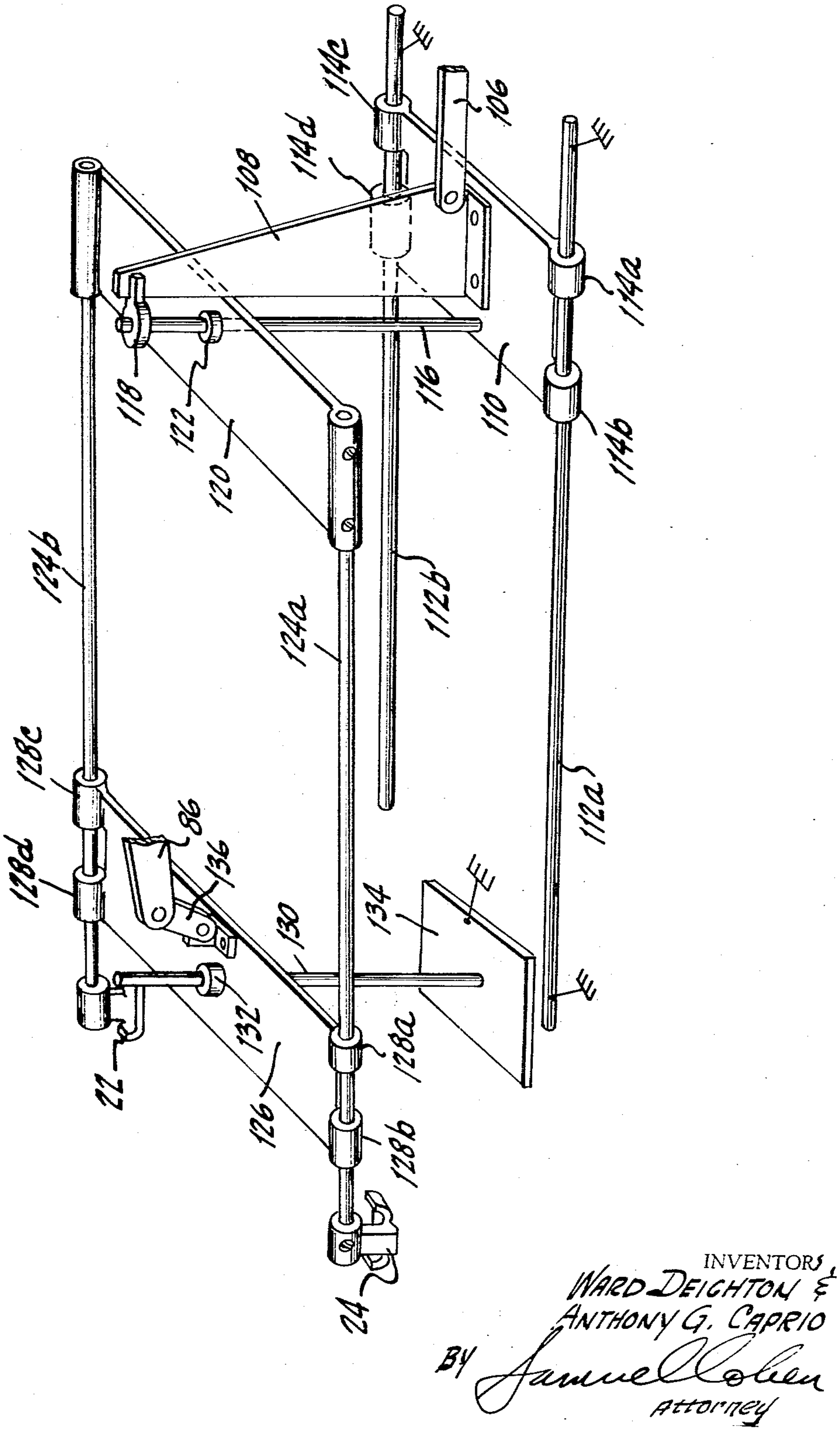
FIGURE 10 is a perspective showing of a portion of the arrangement of FIGURES 8 and 9.

Details of the driving mechanism for the cartridge appear in FIGURES 8, 9 and 10. FIGURES 8 and 10 should be referred to first. Of these two figures, FIGURE 8 shows the various elements in approximately correct positional relationship and approximately correct proportions. FIGURE 10 is a perspective showing of some of the elements of FIGURE 8 with minor changes in proportions and shapes for the purpose of showing more clearly their functional inter-relationship.

The central drive axle for the system is shown at 74 in FIGURE 8. It is coupled through gearing to a motor, both of which are schematically represented by the single block 76. An electrical power supply for the motor, such as a 60-cycle source, is represented schematically at 78.

Two cams 80 and 82 are fixed to the drive axle 74. Cam 82 controls the vertical movement of hooks 22 and 24, and cam 80 controls their horizontal movement, as will become clear from the discussion which follows. Cam 82 engages a roller 84 on the lever arm 86. Cam 80 engages a roller 88 on the lever arm 90.

Lever arm 90 is movable about a pivot axle 92 and lever arm 86 is movable about a pivot axle 94. Both pivot axles are fixed to the chassis, as indicated by appropriate symbols. Spring 96 is secured at one end to a projecting arm 98 of lever arm 90, and at its other end to a pin 100 which is fixed to the chassis. Spring 102 is secured at one end to the lever arm 86 and at its other end to a pin 104 which is secured to the chassis. The purpose of springs 96 and 102 is to maintain the rollers 88 and 84, respectively, in engagement with their respective cams, as the cams rotate.

Lever arm 90 is connected by means of link 106 to the bottom portion of a vertical, trapezoidally shaped plate 108. This plate is fixed to a first carriage 110 which is slidable along a pair of rods 112*a*, 112*b*. The carriage 110 and the rods along which it slides are more clearly visible in FIGURE 10 than in FIGURE 8. The carriage 110 is supported on the rods by means of bearings 114*a*–114*d*. Two of the bearings are visible in FIGURE 8 and all four bearings may be seen in FIGURE 10. The rods 112*a* and 112*b* are fixed at their opposite ends to the chassis.

A vertical rod 116 is secured at one end to the carriage 110 and is held in place at its other end by a clamp 118 which is fixed to the supporting plate 108. A second carriage 120 is slidably mounted on the rod 116 by means of a slide bearing 122. Horizontal rods 124*a* and 124*b* are fixed at one end to the carriage 120.

A third carriage 126 is slidably mounted on rods 124*a*, 124*b* by bearings 128*a*–128*d*. The carriage 126 is also slidably mounted on a second vertical rod 130 by means of a slide bearing 132. Rod 130 is fixed at its base to the chassis, as indicated schematically by the broken-away piece 134 in FIG. 10.

The lever arm 86 which, it will be recalled, controls the vertical movement of the hooks is secured to the carriage 126 by means of a link 136. Movement of the link 136 causes the carriage 126 to ride up and down on rod 130. The hooks 22 and 24 which engage the cartridge are fixed to the ends of rods 124*b* and 124*a*, respectively.

In the operation of the system described, as the drive axle 74 rotates, the lever arm 90 is driven about its axle 92 in the direction of arrows 138. This causes movement of the link 106 in the horizontal direction, as indicated by arrows 140. This movement, in turn, causes the carriage 110 to ride along the guide bars 112*a* and 112*b*. It also causes the carriage 120, which is slidably mounted on the rod 116, to move in the same direction and in the same amount as carriage 110. All of this motion is motion in a horizontal plane.

The drive axle 74 and cam 82 cause the lever arm 86 to be driven about its axle 94 in the direction of arrows 142. This movement causes the third carriage 126 to ride up and down on its supporting bar 130. As the carriage 120 is mounted on the same rods 124*a* and 124*b* as carriage 126, carriage 120 also rides up and down. Thus, the cam 82 controls vertical movement of the carriage 126 and the bars 124*a* and 124*b* on which the carriage is mounted, and the cam 80 controls the horizontal movement of the bars 124*a* and 124*b*. As the hooks 22 and 24 are fixed to the ends of these bars, these hooks are moved horizontally and vertically as the drive axle 74 rotates, in accordance with the shape of the cams.

In the position of the driving arrangement shown in FIGURE 8, the hooks 24 and 22 are in their furthest downward position. The cartridge 10 is in its operative position located on the pins 36 and 34 (only pin 36 being visible), and the latches, one of which is shown at 30, are in place over the respective pins at the sides of the cartridge. One pin is shown at 28. When the cartridge is in this position, the drive mechanism 76 comes to rest.

There is a microswitch located on the platform 54, but shown in FIGURE 8 at 144 within the power supply block 78. If there is no cartridge on platform 54, the microswitch is closed and, upon command, the drive mechanism will start up and the latch release mechanism will raise the latch 30 and permit the cartridge to be withdrawn. On the other hand, if the operator has not yet removed the cartridge from platform 54, this cartridge will maintain the microswitch 34 in its open position. In this position, the power supply 78 cannot be made to start up. This is a safety feature as it prevents a cartridge from being removed until there is place for that cartridge on the cartridge receiving platform 54.

Figure 12:
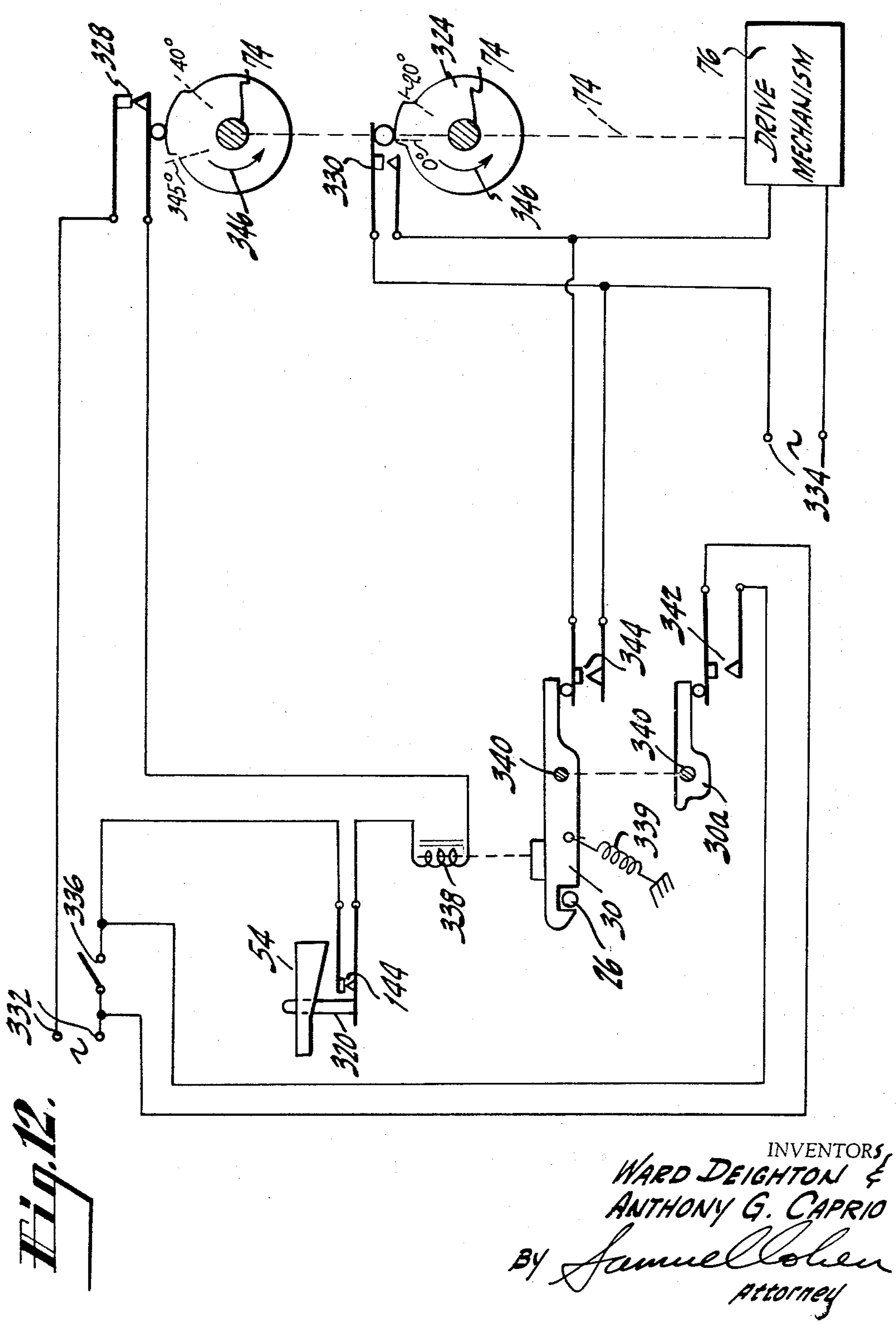
FIGURE 12 is a schematic circuit diagram of certain of the electrical control circuits of the present system.

FIGURE 12 shows some of the electrical details of the microswitch circuit above and of other electrical circuits. The platform is shown at 54 and the microswitch at 144. The microswitch is normally closed but when a cartridge is standing on platform 54 it abuts the pin 320 and the microswitch opens.

The latch 30 of FIGURE 8 and the opposite latch 30*a* for pin 26 are also shown in FIGURE 12. The latch 30 is shown in place over the pin 28 of the cartridge. The cartridge itself is assumed to be in place, that is, in its operative position on the platform 47 of FIGURE 8.

The shaft 74 is shown schematically at the right side of the figure. In addition to the horizontal and vertical motion cams of FIGURE 8, there are two additional cams 322 and 324 located on shaft 74. These are relatively small cams and are for the purpose of controlling switches 328 and 330.

In the operation of the arrangement of FIGURE 12, power is normally applied to input terminals 332 and 334. The cartridge change switch 336 (which may be manually or automatically actuated) is open so that the solenoid 338 is not energized. When the change switch 336 is momentarily depressed, power supplied from terminals 332 through switch 336 and normally closed switches 144 and 328 to the solenoid 338 energizing the solenoid. The energized solenoid causes the latches 30 and 30*a* to rotate about their pivot axle 340. Note here that if there had been a cartridge in place on platform 54 switch 144 would have been open rather than closed and power could not have been applied to solenoid 338. Accordingly, if a cartridge had been in place on platform 54, the latch could not have been released and the cartridge changing cycle could not have been started.

As mentioned above, when the solenoid 338 is energized, the latches 30 and 30*a* rotate about their pivot axle 340 and the pins 28 (and 26), the latter shown in FIGURE 1, are released. The cartridge is now free to be lifted. The rotation of latch 30*a* closes switch 342. This switch provides a bypass for the starting switch 336 so that the starting switch may be released and power continued to be applied to the solenoid 338.

Rotation of the latch 30 closes switch 344. This establishes a closed circuit from the power supply terminals 334 to the drive mechanism 76 and the latter starts to rotate the shaft 74 and cams 322 and 324 in the direction of arrows 346. Note here the additional safety feature that before the latches 30, 30*a* are lifted thereby freeing the cartridge, the drive mechanism cannot be started.

When 20 degrees of rotation are reached, the cam 324 closes switch 330. This switch acts as a holding circuit so that the power from terminals 334 continues to be applied to the drive mechanism 76 after the switches 344 open.

When 40 degrees of rotation are reached, the cam 322 opens the switches 328. This opens the circuit to solenoid 338 and the spring 339 draws latches 30 and 30*a* back to their original position. The switch 344 now opens but this does not affect the power applied to the drive mechanism as the alternate path through switch 330 is closed. Switches 342 also open removing the bypass from across the cartridge change switch 336.

When 345 degrees of rotation are reached, the cam 322 again closes switch 328 placing the circuit in condition again to be actuated by depression of the start switch 336. When approximately 360 degrees of rotation are reached, the cam 324 opens the switch 330 and the complete circuit is now placed in its original condition.

FIGURE 9 shows the same mechanism as shown in FIGURE 8, but in a different portion of its operating cycle. The third carriage 126 is now in a raised position and the first and second carriages 110 and 120 have been moved to the left. The cartridge 10, which has been moved from its operating position, is now located over the platform 54. As the cams continue to rotate, the cartridge will be lowered onto the platform in the manner already discussed.

While the embodiment of the invention illustrated is a preferred embodiment, many alternative constructions are possible. For example, rod 116 may be fixed to the second carriage 120 and slidable in a bearing in the first carriage 110, rather than as shown. Similarly, the rod 130 may be fixed to the third carriage 126 and slidable through a bearing fixed to the chassis. These and other similar structures which are equivalent to the structure shown, are intended to be covered in the claims which follow.

What is claimed is:

1. In a cartridge changing mechanism for a magnetic tape system, in combination:

a magnetic tape cartridge having a base;

a receiving station for the cartridge having a horizontal base adapted to receive the base of the cartridge and a cam surface which extends at a generally oblique angle from said base; and means coupled to the cartridge for lowering the cartridge along a straight line first path, onto said cam surface, thereby causing a lower edge of the cartridge to ride along the cam surface until it abuts said base of said receiving station, the cartridge tilting in the process, and for then moving along a substantially horizontal path in a direction toward said horizontal base, for pivoting the cartridge about said lower edge until it is in its upright position on said base of said receiving station.

2. In a cartridge-changing mechanism for a magnetic tape system, in combination:

a magnetic tape cartridge having a base;

a receiving station for the cartridge having a horizontal base adapted to receive the base of the cartridge and a cam surface which extends at a generally oblique angle from said base; and means coupled to the cartridge for positioning the cartridge so that its base is parallel to, in front of and above the base of the receiving station, and over said cam surface, for then lowering the cartridge, along a straight line first path, onto said cam surface, thereby causing a lower edge of the cartridge to ride along the cam surface until it abuts said base of said receiving station, the cartridge tilting in the process, and for then moving along a second path, generally perpendicular to the first path and toward said horizontal base, for pivoting the cartridge about said lower edge until it is in its upright position on said base of said receiving station.

3. In a cartridge-changing mechanism for a magnetic tape system, in combination:

a magnetic tape cartridge having a base and formed with slots opening on said base;

a receiving station for the cartridge having a base adapted to receive the base of the cartridge, and a cam surface which extends at a generally oblique angle from said base, and alignment pins positioned to mate with said slots; and means coupled to the cartridge for positioning the cartridge so that its slots are parallel to, in front of and above said pins, and a lower edge of said cartridge is over said cam surface, then lowering the cartridge, along a straight-line first path, onto said cam surface, thereby causing said lower edge of said cartridge to ride along the cam surface until it abuts said base of said receiving station and, during such movement, the cartridge to tilt and its slots to engage said alignment pins, and for then moving along a second path, generally perpendicuar to the first path, for pivoting the cartridge about said lower edge until it is in its upright position on said base of said receiving station.

4. In a cartridge changing mechanism for a magnetic tape system, in combination:

a magnetic tape cartridge having side plates which are slotted at their lower edges;

a receiving station for the cartridge including a base for receiving the base of the cartridge, pins which are positioned to engage the slots in the side plates of the cartridge when the cartridge is in place in said receiving station, and a cartridge guiding cam surface which extends at a generally oblique angle from said base of said receiving station; and means coupled to the cartridge for lowering the cartridge, in a straight line first path, onto said cam surface, whereby the base of the cartridge rides along the cam surface until it abuts the base of said receiving station and the slots engage the pins, the cartridge tilting in the process, and for then moving, along a second path, generally perpendicular to the first path for pivoting the cartridge about its lower edge until it is in its upright position.

5. In a cartridge-changing mechanism for a magnetic tape system, in combination:

a magnetic tape cartridge having side plates with slots opening on their lower edges;

a receiving station for the cartridge including a base for receiving the base of the cartridge, pins spaced from the base which are positioned to mate with the slots in the side plates of the cartridge, and two spaced cartridge-guiding cam surfaces which extend at a generally oblique angle from said base of said receiving station and which are positioned to engage the side plates; and means coupled to the cartridge for positioning the same with its slots parallel to, above and in front of said pins, and with the lower front corners of the side plates aligned with the cam surfaces, then lowering the cartridge, in a straight line first path, so that said lower front corners of said side plates ride along said cam surfaces until they abut the base of said receiving station, the cartridge tilting during said movement and the slots in the side plates engaging the pins, then moving generally perpendicular to the first path for pivoting the cartridge about its lower edge until it is in its upright position.

6. In a cartridge-changing mechanism for a magnetic tape system, in combination:

a magnetic tape cartridge having a base and formed with slots opening on said base and having pins which extend from the sides thereof;

a receiving station for the cartridge having a base adapted to receive the base of the cartridge, a cam surface which extends at a generally oblique angle from said base, alignment pins positioned to mate with said slots, and latches positioned to engage the pins which extend from the sides of the cartridge; and means coupled to the cartridge for positioning the cartridge so that its slots are parallel to, in front of and above said pins, and a lower edge of said cartridge is over said cam surface, then lowering the cartridge, along a straight-line first path, onto said cam surface, thereby causing said lower edge of said cartridge to ride along the cam surface until it abuts said base of said receiving station and, during such movement, the cartridge to tilt and its slots to engage said alignment pins, and for then moving along a second path, generally perpendicular to the first path, for pivoting the cartridge about said lower edge until its pins are engaged by the latches and the cartridge is in its upright position on said base of said receiving station.

7. In a cartridge-changing mechanism for a magnetic tape system, in combination:

a magnetic tape cartridge having side plates with slots opening on their lower edges;

a receiving station for the cartridge including a base for receiving the base of the cartridge, pins spaced from the base which are positioned to mate with the slots in the side plates of the cartridge, and two spaced cartridge-guiding cam surfaces which extend at a generally oblique angle from said base of said receiving station and which are positioned to engage the side plates;

means coupled to the cartridge for positioning the same with its slots parallel to, above and in front of said pins, and with the lower front corners of the side plates aligned with the cam surfaces, then lowering the cartridge, in a straight line first path, so that said lower front corners of said side plates ride along said cam surfaces until they abut the base of said receiving station, the cartridge tilting during said movement and the slots in the side plates engaging the pins, then moving generally perpendicular to the first path for pivoting the cartridge about its lower edge until it is in its upright position, said means comprising:

a pair of horizontal first rails which are fixed to a chassis;

a horizontal first carriage which is slidable along said rails;

a vertical rod which is fixed to the carriage;

a horizontal second carriage which is slidable along said vertical rod;

a pair of second rails which are parallel to the first rails and are fixed to the second carriage;

a vertical second rod which is fixed to the chassis;

a third horizontal carriage which is slidable along both the second rod and the second rails;

cartridge holding means fixed to said pair of second rails and supporting said cartridge during the movement thereof; and driving means coupled to said first and third carriages for driving the first carriage along said first rails and for driving the third carriage along said second rod.

References Cited

UNITED STATES PATENTS

| | | | |
|---|---|---|---|
| 2,868,891 | 1/1959 | Brewster | 179—100.2 |
| 2,941,739 | 6/1960 | Burke et al. | 242—55.12 |
| 3,083,269 | 3/1963 | Gaubert | 274—11 X |
| 3,134,550 | 5/1964 | Camras | 242—55.13 |
| 3,167,267 | 1/1965 | Crane | 242—55.13 |
| 3,197,826 | 8/1965 | Sanchez | 214—1 X |

ROBERT G. SHERIDAN, *Primary Examiner.*

MARVIN A. CHAMPION, *Examiner.*